UNITED STATES PATENT OFFICE.

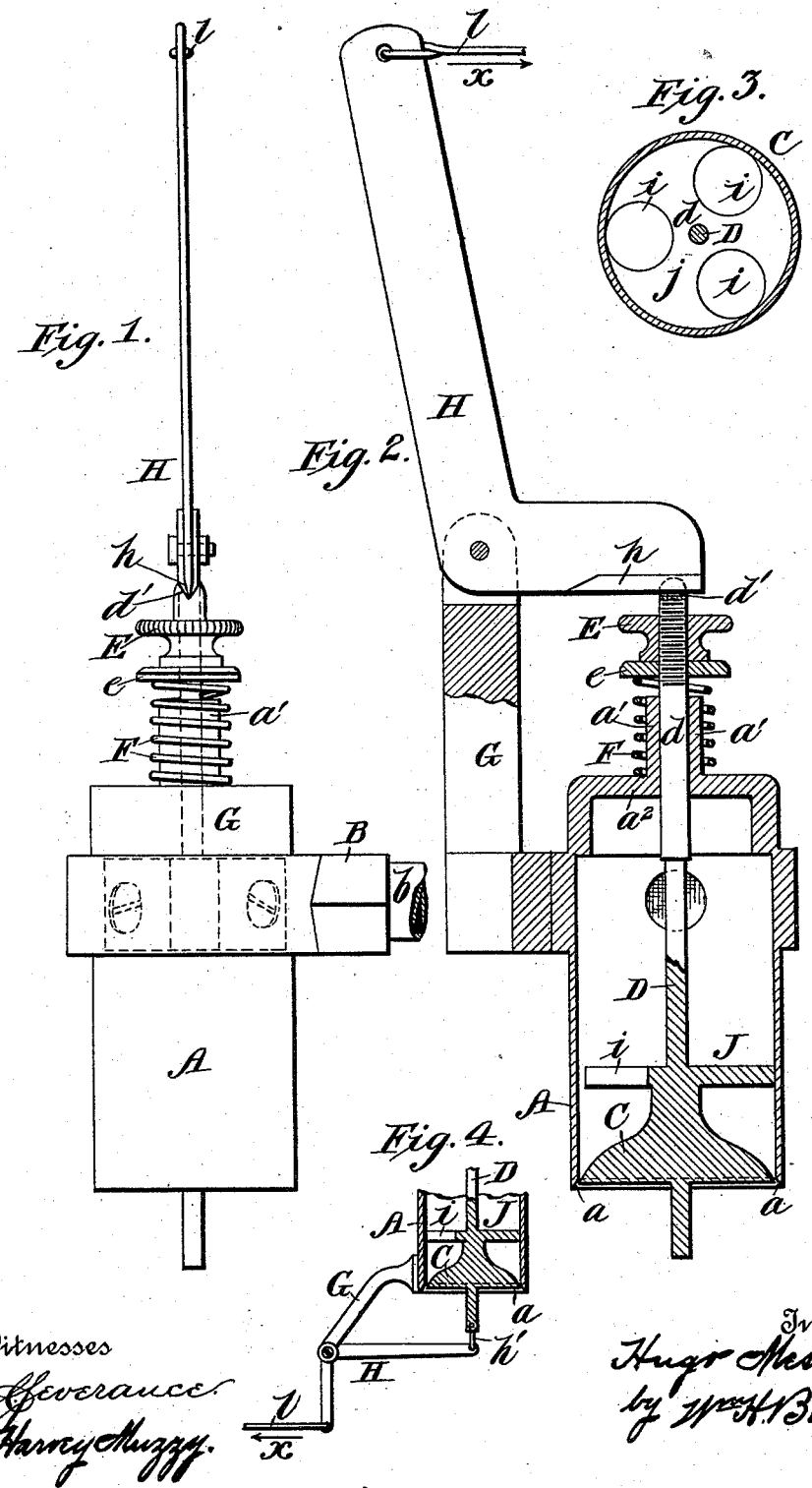

HUGO MESTERN, OF MANNHEIM, GERMANY, ASSIGNOR TO ALEXANDER STOLZENBERG, OF SAME PLACE.

SPRAY-PRODUCER.

SPECIFICATION forming part of Letters Patent No. 470,583, dated March 8, 1892.

Application filed November 27, 1891. Serial No. 413,339. (No model.)

*To all whom it may concern:*

Be it known that I, HUGO MESTERN, a subject of the German Emperor, residing at Mannheim, in the Grand Duchy of Baden, Empire of Germany, have invented certain new and useful Improvements in Spray-Producers; and I do hereby declare the following to be a full, clear, and exact description of the invention, such as will enable others skilled in the art to which it appertains to make and use the same.

The object of this invention is to improve the ordinary spray-producer used for cooling or ventilation, in which the outflow of the water usually proceeds from a narrow circucular slit or ring of small perforations.

In spray-producers the impurities from which water is never free are not provided against with the result that after a certain time an obstruction in the outflow-aperture takes place, whereby the regular action of the sprinkling-rose is disturbed. The passages and holes that are difficult of access become stopped up and require frequent cleaning, which is often a very troublesome operation, owing to the difficulty of taking to pieces and putting together again of the different parts of the apparatus. The following invention is designed to obviate these difficulties and to provide a cleaning apparatus for the above-mentioned spray-producer, over which therefore it has a great superiority. The said cleaning device can be set in any preferred position.

In the accompanying drawings, the invention is shown in working form, Figure 1 representing a front elevation of the devices embodying the invention. Fig. 2 represents a vertical section of the same. Fig. 3 represents a transverse section on the line $x$ $x$ of Fig. 2, and Fig. 4 represents a modification of my invention.

The cone which regulates the outflow at the mouth of the chamber A leaves only a narrow annular slit or ring of small holes free. In connection with this cone is a pulling or pressing lever, which is worked by means of a rod, wire, or chain or other suitable material and with which the outflow at the cone is adjusted. The slit or rose may be enlarged with this lever, so that the pressure of water caused by the production of a strong stream sweeps all obstructions away and thoroughly cleans the said mouth-piece.

The containing-chamber or outside wall of the apparatus is a cylindrical tube A. This is made in combination with a one-sided supporting-bar B and the pressure tube or pressure-water conduit $b$. The sprinkling-cone C lies in the mouth $a$ of the chamber A and allows a fine circular-shaped spray or outflow of water to pass therethrough. This cone is held firmly by the plate J, which fits tightly in the cylinder A, and in which holes $i$ $i$ $i$ are made to permit the water to flow freely. This plate is supported in turn by the spindle D, which passes upward through an aperture in the outer case and above which it is threaded and carries a nut E. Below the nut E lies the washer $e$, against which presses a spiral spring F, that is coiled around the projection $a'$, standing on the roof $a^2$ of the chamber A. A spring of india-rubber or any other elastic material might be substituted for the metal spring F, in order to bring the cone C back into its working position.

On the rod D works an angle-lever H, which is firmly attached to A by its pivot-bar G. The lever H is provided with a knife-like edge at $h$, in order to fit into the groove $d'$ of the rod D. To the other end of the said lever is attached a wire or cord $l$, by means of which pressure may be put on H at will. The cord $l$ is drawn in the direction indicated by the arrow $x$, so that the lever H presses down the cone C, whereby the ring-formed spray becomes much enlarged. The downward rush of the outpouring water washes away all obstructions from the cone C and the mouth of the chamber A. As soon as the impurities have been carried away the cone C returns automatically to its old position by means of the pressure exerted by the spring F. The lever H is so arranged that it exerts a direct pressure on C when set in motion.

In Fig. 4 is shown another way of arranging my spray-producer. The dispersing cone C is fastened by the connecting-bar $h'$ to the double lever H, which is fixed to A by the arm G. To the free arm of H is attached the wire or cord $l$. By pulling in the direction of the arrow $x$ the cone C is lowered from the chamber A, whereby the flow of water is increased. As soon as the obstructions are removed the cone is automatically forced back into its old position by the spring F, as shown in Fig. 2.

Having thus described my invention, what I claim as new, and desire to secure by Letters Patent, is—

1. In a spray-producer, the combination, with a spring-mounted cone and its containing-cylinder, of an apertured guide-plate attached to said cone and fitting snugly in said cylinder and devices for actuating said cone to enlarge the discharging volume of water, substantially as set forth.

2. In a spray-producer, the combination, with the spring-mounted cone and its containing-cylinder, of an apertured guide-plate attached to said cone and fitting snugly in said cylinder, and an angular arm pivoted on an extension of said cylinder and operating to depress said cone, substantially as set forth.

3. In a spray-producer, the combination, with a spraying-cylinder, of a cone placed in an opening thereof, an apertured guide-plate reciprocating in said cylinder, a shank attached to said cone and plate, a spring engaging said shank and holding said cone normally in contact with said cylinder, and a lever for depressing said shank, all substantially as and for the purpose set forth.

HUGO MESTERN.

Witnesses:
ALEXANDER STOLZENBERG,
FERD BOPP.